United States Patent [19]

Somers

[11] Patent Number: 5,733,645
[45] Date of Patent: Mar. 31, 1998

[54] COEXTRUDING TACKY AMORPHOUS PROPYLENE COPOLYMER COMPOSITION

[76] Inventor: Marc Stacey Somers, 304 Rebecca Cir., Longview, Tex. 75605

[21] Appl. No.: 692,364

[22] Filed: Aug. 5, 1996

Related U.S. Application Data

[62] Division of Ser. No. 435,072, May 8, 1995.

[51] Int. Cl.⁶ .................................................. B32B 7/02
[52] U.S. Cl. ................... 428/219; 428/220; 524/68; 524/70; 524/449; 524/490; 525/240; 525/211; 525/528
[58] Field of Search ................. 524/68, 70, 528, 524/490, 505; 525/240, 232, 70, 222, 227, 88, 89

[56] References Cited

U.S. PATENT DOCUMENTS

| | | |
|---|---|---|
| 3,954,697 | 5/1976 | McConnell et al. ............ 526/350 |
| 4,426,498 | 1/1984 | Inoue et al. .................... 525/240 |
| 4,748,796 | 6/1988 | Viel . |
| 5,041,251 | 8/1991 | McCoskey et al. . |
| 5,045,589 | 9/1991 | Ueno ............................... 524/505 |
| 5,109,892 | 5/1992 | Somers . |
| 5,160,686 | 11/1992 | Thaler et al. . |
| 5,201,420 | 4/1993 | Thaler et al. . |
| 5,286,776 | 2/1994 | Ichikawa et al. ................ 524/449 |
| 5,292,468 | 3/1994 | Colombani . |
| 5,307,608 | 5/1994 | Muir et al. . |
| 5,397,843 | 3/1995 | Lakshmanan et al. ........... 525/24 |
| 5,401,455 | 3/1995 | Hatfield et al. . |
| 5,478,891 | 12/1995 | Lakshmanan et al. ........... 525/240 |
| 5,482,982 | 1/1996 | Lakshmanan et al. ........... 524/68 |

*Primary Examiner*—Merrick Dixon
*Attorney, Agent, or Firm*—Andrew B. Griffis; Harry J. Gwinnell

[57] ABSTRACT

Disclosed is a process for producing non-blocking slats of normally tacky amorphous propylene copolymers. The process entails coextruding the normally tacky amorphous propylene copolymer with a low viscosity polyolefin such as a polyethylene wax forming a core of amorphous propylene copolymer covered with a sheath of polyethylene wax. The coextruded article is cooled, cut (while exposing less than 40 percent of the core) and then coated with a non-tacky powder; thereby, forming non-blocking slats. Disclosed is also a novel amorphous propylene copolymer composition containing no more than 90 weight percent propylene and up to 70 weight percent of an alpha olefin comonomer having a needle penetration greater than 70 to less than 100 dmm at 23° C. and a Brookfield Thermosel Viscosity below 1000 cP at 190° C.

9 Claims, 1 Drawing Sheet

COEXTRUDING TACKY AMORPHOUS PROPYLENE COPOLYMER COMPOSITION

This is a divisional application of copending application Ser. No. 08/435,072, filed May 8, 1995, pending.

FIELD OF THE INVENTION

The present invention relates to a process for preparing articles of normally tacky amorphous propylene copolymers. The present invention also relates to novel amorphous propylene copolymer compositions. The present invention further relates to articles of normally tacky amorphous polypropylene compositions that do not block when packaged together.

BACKGROUND OF THE INVENTION

Amorphous polyolefins are well known and are very useful in adhesives, roofing compositions, cable filing, cable flooding, and caulks and sealants. Amorphous polyolefins are produced and then transferred or shipped in many different forms for incorporation into final compositions. Amorphous polyolefins are generally tacky at room temperature and have a low degree of crystallinity and therefore are not easily formed into powders or pellets for shipment. Amorphous polyolefins are generally transferred in the molten state in large containers or small and large blocks packaged in a release coated paper container and in some instances as small slats coated with a non-tacky substance packaged in corrugated containers.

A preferred form to transfer amorphous polyolefins is in the bulk molten form. The bulk molten form is preferred due to its low processing cost. However, the bulk molten form is shipped in large containers such as tank cars and many end users do not have the capability to unload or store these large quantities of molten amorphous polyolefins. However, the use of the solid block form of amorphous polyolefin is very labor intensive, requiring the end user to remove the coated paper prior to blending. The paper is often adhered to the APO and difficult to remove and also generates solid waste. The larger solid form i.e. 50 pound package is generally preferred over the 20 pound package due to the reduced time spent to remove the package from around the block per any given amount of amorphous polyolefin. Due to the difficulties associated with the molten or block forms, many end users would prefer amorphous polyolefin packaged in an economical and easy to use solid form.

Compounders or end users of the amorphous polyolefin prefer forms of the solid amorphods polyolefin that are easy to handle. Amorphous polyolefin pellets would be most desirable, however, their production is very difficult and they are not commercially available. Thus, of the available forms, amorphous polyolefin slats are generally the form most preferred and easiest to handle. However, it was discovered that some amorphous polyolefins cannot even be formed into slats.

It has been found that certain polymeric compounds that are inherently "soft and tacky" such as certain amorphous polypropylene copolymers are extremely difficult to process into the form of usable slats. These materials must then be produced and sold in some other less desirable form.

EASTOFLEX E1003 from Eastman Chemical Company is one such amorphous propylene/ethylene copolymer in that it is a low viscosity (less than 1000 cP at 190°C.) amorphous propylene copolymer with a relatively high comonomer (ethylene) content. These characteristics make the material very soft and pressure sensitive. The material is so soft, that it cannot be considered a "solid" at room temperature (23°C.). This, in combination with its tack, make the polymer extremely difficult to handle as anything but a molten liquid. For this reason, an alternate method for handling materials like E1003 is needed.

As stated above a normal means to handle an amorphous polyolefin or hot melt adhesive is to pour the molten material into a silicone coated release container in the form of a block. It is easy enough to fill materials like E1003 into this type of carton, but not so easy to remove them from the container. E1003 will not release from silicone coated release paper at typical ambient conditions. The polymer has very low cohesive strength and would rather stick to the release paper than to itself. It's low cohesive strength is represented by its low tensile strength (less than 150 kPa). Another indication of an APOs tensile strength is its needle penetration value. The higher the needle penetration value, the softer and weaker the polymer and E1003 has a needle penetration value greater than 95 dmm at 23°C.

Another problem with trying to use materials like E1003 with this type of package is that one needs to physically grab the material while trying to separate the release coated container from the E1003. Since E1003 is not a solid at typical ambient conditions, one cannot grab the material to pull it away from the carton. It sticks to hands, gets between fingers and still does not separate from the release coated container. One way to get around this problem is to cool the product to <0°C. to harden (strengthen) the polymer before removing it from the container. This works fine except that a large freezer is required to store significant quantities of materials like E1003 and the final product is used molten, thus cooling the product right before melting it is a waste of time and energy.

The current method of packaging materials like E1003 is to put it into a release lined fiber drum. The drum is designed to be used with a "drum unloader", where a heated platen is inserted into the drum and pumps the material off as it melts. However, most end users do not have this type of equipment because of their high cost. So, most end users try to cut through the drum, pry it open and dig out the E1003. This is extremely difficult, very labor intensive and messy.

Another common method of processing amorphous polyolefins and hot melt adhesives is to extrude the materials, quench cool them then cut or chop them into their final physical form (slats). However, some amorphous polyolefins, such as E1003 are difficult to extrude, cut or chop, because they are too soft and tacky after melt extruding and quench cooling that they do not feed well into the cutting device (deform under the pressure of the take up device) or they deform under shear forces in the cutter or chopper and gum up or wrap the cutting blade(s). The majority of amorphous polyolefins slat (term for coextrusion of amorphous polyolefins with non-tacky polyolefin material) very well. In general, butene and hexene copolymers slat at lower rates than propylene homopolymers and ethylene copolymers with needle penetrations less than 40 dmm at 23°C.

In light of the above, it would be very desirable to be able to produce a solid form of low viscosity, low tensile strength, tacky amorphous propylene copolymers that is convenient to use and does not require the labor to unwrap.

SUMMARY OF THE INVENTION

The process according to the present invention comprises:
(a) providing near the surface of an extrusion die, near or above the ring and ball softening point, an amorphous propylene copolymer composition comprising no more than about 90 weight percent propylene and up to 70 weight percent of an alpha olefin comonomer having 2 to 8 carbon atoms wherein the composition has a needle penetration of greater than 70 to less than 100 dmm at 23°C. and a Brookfield Thermosel Viscosity below 1,000 cP at 190°C.;

(b) coextruding the above amorphous propylene copolymer composition with a sheath of a low viscosity non-tacky polyolefin having a Brookfield Thermosel Viscosity of 100 to 50,000 cP at 150°C. and a needle penetration of less than 20 dmm at 23°C., wherein said sheath is at a concentration of about 1 to 20 weight percent based on the total weight percent of the non-tacky polyolefin and amorphous propylene copolymer;

(c) contacting the coextruded amorphous propylene copolymer and sheath of non-tacky polyolefin onto a surface having a temperature below the ring and ball softening point of the amorphous propylene copolymer;

(d) cutting the coextruded amorphous propylene copolymer and sheath of non-tacky polyolefin below the ring and ball softening point of the amorphous propylene copolymer into slats, wherein the surface area exposed by cutting is less than 40 percent of the entire slat surface area such that the surface area of the slat that is sheathed in the low viscosity polyolefin is greater than 60 percent; and (e) coating the cut slats with a non-tacky powder at a concentration of about 1 to 20 weight percent of the total cut slats.

The slattable composition according to the present invention comprises no more than about 90 weight percent propylene and up to 70 weight percent of an alpha olefin comonomer having 2 to 8 carbon atoms wherein the composition has a needle penetration of greater than 70 to less than 100 dmm at 23°C. and a Brookfield Thermosel Viscosity below 1,000 cP at 190°C.

The present invention further entails non-tacky block resistant articles that comprise cut slats containing an amorphous propylene copolymer composition core having no more than about 90 weight percent propylene and up to 70 weight percent of an alpha olefin comonomer having 2 to 8 carbon atoms wherein the composition has a needle penetration of greater than 70 to less than 100 dmm at 23°C. and a Brookfield Thermosel Viscosity below 1,000 cP at 190°C.; said core coated with a sheath of a low viscosity non-tacky polyolefin having a Brookfield Thermosel Viscosity of 100 to 50,000 cP at 150°C. over at least 60 percent of the surface area of said core; and the cut slats are powder coated with about 1 to 20 weight percent of a non-tacky powder.

DETAILED DESCRIPTION OF THE INVENTION

Figure 1:
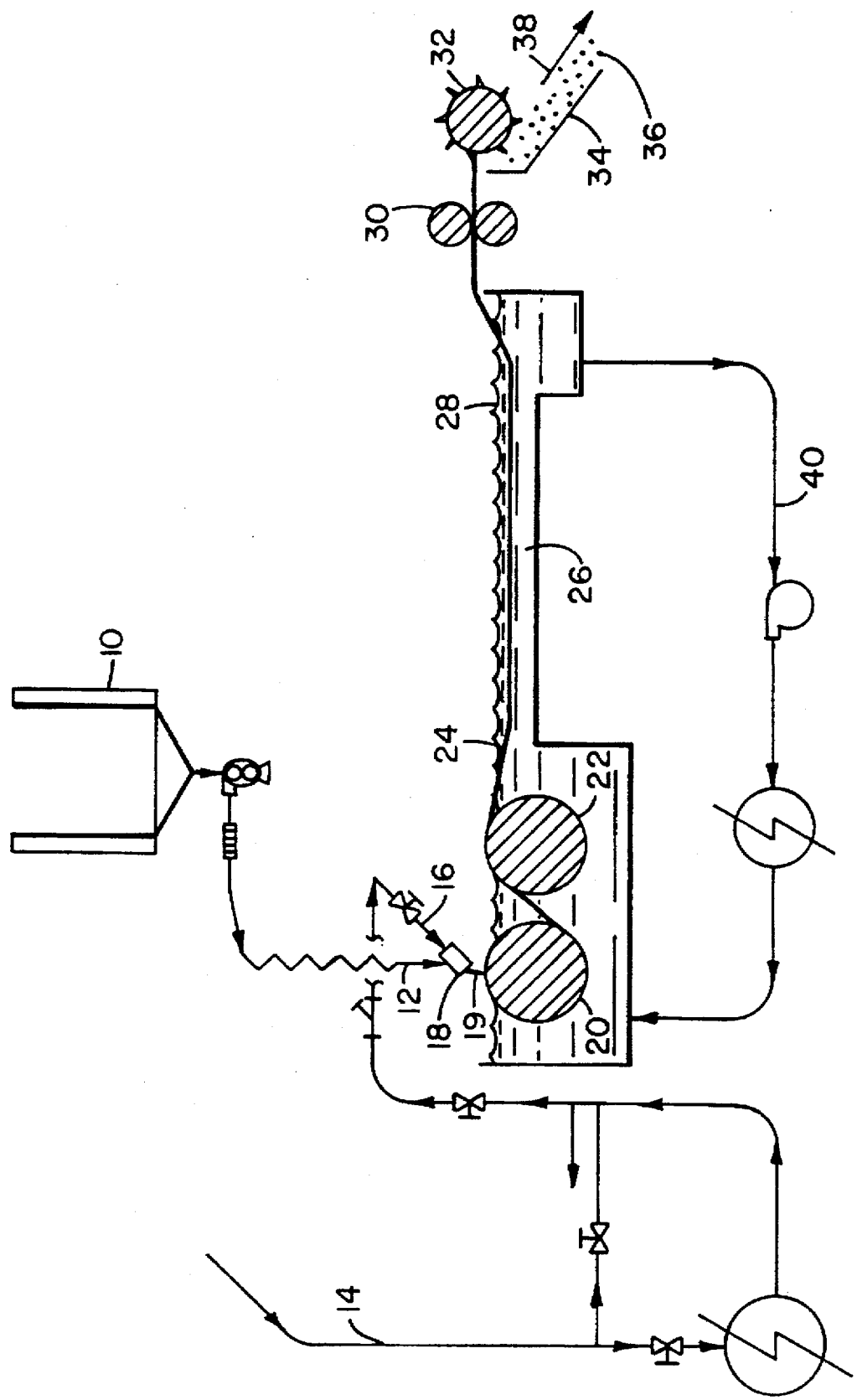
FIG. 1 depicts a slatting process extrusion coating a core of the normally tacky amorphous propylene copolymer with a sheath of a low viscosity non-tacky polyolefin that is cooled, cut, and then powder coated.

The applicant has unexpectedly discovered that amorphous propylene copolymers with a particular set of properties can be formed into slats. Prior to the present invention it was not known that tacky amorphous propylene copolymers of low cohesive strength, having a needle penetration of greater than 70 to less than 100 dmm at 23°C. and a Brookfield Thermosel Viscosity below 1,000 cP at 190° C. could be formed into slats. Applicant also unexpectedly discovered that tacky amorphous propylene copolymers could be formulated by blending to be within this set of properties and be able to be formed into slats.

The amorphous propylene copolymer composition can contain up to 70 weight percent of an alpha olefin copolymer having 2 to 8 carbon atoms. The preferred alpha olefin copolymers are ethylene and hexene. When hexene is the comonomer it can be present at a concentration generally higher than ethylene and can be 20 to 70 weight percent of the monomer concentration and still generally fall within the physical properties of the amorphous propylene copolymer composition. When the comonomer is ethylene it is generally at a comonomer concentration of about 10 to 30 weight percent.

The amorphous propylene copolymer composition has a needle penetration greater than 70 to less than 100 dmm at 23°C. This needle penetration is preferably greater than 70 to 95 dmm at 23°C. with a needle penetration of about 75 to 95 dmm at 23°C. being more preferred. Needle penetrations within these ranges are generally preferred due to the unexpected discovery that compositions having this needle penetration could be slatted (i.e. coextruded, cut and dusted to form packageable slats).

The amorphous propylene copolymer composition according to the present invention has a Brookfield Thermosel Viscosity below 1000 cP at 190°C., preferably below 800 cP at 190°C. The amorphous propylene copolymer composition generally has a Brookfield Thermosel Viscosity below 1000 cP at 190°C. since lower viscosity polymers are generally softer and tackier than their higher viscosity counter parts and, therefore, are more useful as adhesive and sealant raw materials and tack additives.

The amorphous propylene copolymer composition can be a single component or can be a multi-component blend of at least two different amorphous propylene copolymers wherein the resulting blend contains no more than 90 weight percent propylene and up to 70 weight percent of a comonomer selected from the group consisting of alpha olefins of 2 to 8 carbons wherein one amorphous propylene copolymer has a needle penetration below 70 dmm at 23°C. and the other amorphous propylene copolymer has a needle penetration sufficiently high such that the resulting blend has a needle penetration between 70 and 100 dmm at 23°C.

When the amorphous propylene copolymer composition according to the present invention is a blend, one amorphous propylene copolymer is preferably a low tensile strength copolymer having a tensile strength of less than 150 kPa, a needle penetration of greater than 95 dmm at 23°C., and a viscosity less than 1000 cP at 190°C. The other amorphous propylene copolymer composition is a higher tensile strength copolymer having a tensile strength greater than 150 kPa, a needle penetration of less than 70 dmm at 23°C., and a Viscosity greater than 1000 cP at 190°C. It is preferred that the low tensile strength amorphous propylene copolymer is in a concentration of about 60 to 95 weight percent and the higher tensile strength amorphous propylene copolymer is in a concentration of about 5 to 40 weight percent.

The amorphous propylene copolymer composition is coextruded as a core covered with a sheath of low viscosity non-tacky polyolefin having a Brookfield Thermosel Viscosity of 100 to 50,000 cP at 150°C. and a needle penetration of less than 20 dmm at 23°C. This sheath is generally at a concentration surrounding the core at about 1 to 20 weight percent of the total of core and sheath. The low viscosity non-tacky polyolefin is preferably a polyethylene wax and preferably has a Brookfield Thermosel Viscosity of 3000 to 5000 cP at 150°C. This low viscosity non-tacky polyolefin is preferably at a concentration of about 2 to 10 weight percent.

The coextruded amorphous propylene copolymer composition core and low viscosity non-tacky polyolefin sheath are coextruded onto a surface having a temperature below the Ring and Ball Softening Point of the amorphous propylene copolymer followed by cutting below the Ring and Ball Softening Point of the amorphous propylene copolymer into slats wherein the surface area exposed by cutting is less than 40 percent of the entire slat surface area such that the surface area of the slat that is sheathed in the non-tacky polyolefin is greater than 60 percent. The exposed surface area is preferably less than 30 percent of the total surface of the cut slats, more preferably less than 20 percent with an exposed surface area of about 10 percent of the total surface area of the cut slats being more preferred. The exposed surface area of the amorphous propylene copolymer core should generally be less than 40 percent of the surface area since amounts higher than that provide too much unsheathed surface area to be adequately coated with non-tacky powder to prevent the resulting slats from blocking when packaged. When the surface area of exposed amorphous propylene copolymer core is less than 40 percent it is less likely that an exposed side would come into significant contact with another exposed side that is not covered with the low viscosity non-tacky polyolefin sheath.

The non-tacky powder that is powder coated or dusted onto the cut slats can be any type of non-tacky powder but is preferably a polyolefin wax, more preferably a polyethylene wax so long as the powder is compatible with the amorphous propylene copolymer. This powder can be a powdered form of the same material that forms the low viscosity non-tacky polyolefin sheath. When the non-tacky powder is a powdered polyolefin wax it has a Brookfield Thermosel Viscosity of 100 to 50,000 cP at 150°C.

The article of manufacture according to the present invention comprises a cut slat containing an amorphous propylene copolymer composition core comprising no more than about 90 weight percent propylene and up to 70 weight percent of an alpha olefin comohomer having 2 to 8 carbon atoms wherein the composition has a needle penetration of greater than 70 to less than 100 dmm at 23°C. and a Brookfield Thermosel Viscosity below 1,000 cP at 190°C.; said core coated with a sheath of a low viscosity non-tacky polyolefin having a Brookfield Thermosel Viscosity of 100 to 50,000 cP at 150°C. and a needle penetration of less than 20 dmm at 23°C., covering at least 60 percent of the total surface area of said core; and the cut slat is powder coated with about 1 to 20 weight percent of a non-tacky powder.

The article of manufacture according to the present invention is preferably a flat slat having a thickness of about 1 mm to 2 cm, a length of about 1 cm to 20 cm, and a width of about 1 cm to 10 cm, wherein the thickness is less than the length and width. More preferably the article of manufacture is a cut slat that has a thickness of about 1 mm to 1 cm, a length of 1 cm to 10 cm, and a width of about 1 cm to 5 cm.

It is contemplated that any conventional extrusion method would be useful in the process of the present invention. The die hole size, extrusion speed, etc. are not deemed to be critical to the present invention. However, the die holes should be sufficiently small and the extrusion speed should be sufficiently slow so as to yield solid slats or strand in combination with the temperatures of the plastic material and cooling fluid.

After the strands have been formed in the cooling fluid it is preferred that all of the cooling fluid be separated from the slats. When a liquid is the cooling fluid a drying step in generally required.

After being cut the slats are coated with a non-tacky powder. This non-sticky material should be compatible with the amorphous propylene copolymer. By compatible it is meant that the non-sticky material in combination with the amorphous propylene copolymer, when in molten state and in its end use, does not significantly affect the processing conditions or quality of the product. Non-sticky materials such as corn starch are not compatible with these plastic materials since they tend to char and darken the plastic material and are thus not desirable. Examples of suitable non-sticky materials include powders, silicones, and surfactants. The preferred non-sticky materials are powders such as powdered polyolefins. More preferred powders are the powdered polyolefin waxes. Examples of suitable powdered polyolefin waxes include powdered polyethylene wax, powdered polypropylene wax, and powdered Fischer-Tropsch wax. The most preferred non-sticky material is powdered polyolefin wax, such as polyethylene wax, having a particle size between about 1 and 600 microns.

The amount of non-sticky material that is contacted with the slats after they have been separated from the cooling fluid should be an amount sufficient to significantly coat the slats. An excess amount of non-sticky material can be used in this contacting step as long as the slats can be separated from the excess non-sticky material.

FIG. 1 depicts a slatting process that entails a coextrusion, coating a normally tacky amorphous propylene copolymer with a low viscosity non-tacky polyolefin. Molten amorphous propylene copolymer is pumped from a heated tank by a positive displacement gear pump (not shown) into line 14 and then either through a heat exchanger first to cool the polymer or directly through line 16 to the coextrusion die(s) 18. The amorphous propylene copolymer is extruded near or above its Ring and Ball Softening Point. The low viscosity non-tacky or non-sticky polyolefin coating or sheath is pumped from a separate heated reservoir 10 by a positive displacement gear pump to the coextrusion die(s) 18 above its Ring and Ball Softening Point through line 12. The low viscosity non-tacky polyolefin material is extruded around the core of amorphous propylene copolymer to form strand (s) 19 that is contacted onto a chilled surface of chill rolls 20 and 22. The coextruded strand(s) 24 contacts the cooling fluid 26 (generally water), which may or may not contain additives. The strand(s) 24 travels through the cooling fluid 26 at points below the surface 28, then travels through a take-up device 30 and into the cutting device 32. After the material is cut, the slats 36 are dusted above a surface 34 with a non-tacky powder to de-tackify the exposed non-coated cut ends and are removed via 38. Chilled cooling fluid is recycled and cooled via line 40.

The following examples are intended to illustrate the present invention but are not intended to limit the reasonable scope thereof.

EXAMPLES

Blends were made of E1003 and E1060 both propylene/ethylene copolymers from Eastman Chemical Company. E1003 contains about 80 percent propylene and 20 percent ethylene and has a tensile strength less than 100 kPa, needle penetration of about 100 dmm at 23°C., a Brookfield Thermosel Viscosity of about 300 cP at 190°C., and a ring and ball softening point (RBSP) of about 120°C. E1060 contains about 88 percent propylene and 12 percent ethylene and has a tensile strength of about 350 kPa, a needle penetration of about 40 dmm at 23°C., a Brookfield Thermosel Viscosity of about 6,000 cP at 190°C., and a RBSP of about 135°C. Each blend was homogenized in a Cowles Dissolver and brought to a desired melt temperature before slatting. EPOLENE C-15 a polyethylene wax from Eastman Chemical Company having a Brookfield Thermosel Viscosity of about 4,000 cP at 150°C., a RBSP of about 102°C., and a needle penetration of about 4 dmm at 23°C. (also containing antioxidants) was used as the non-stick coating. EPOLENE C-15 powder was used to dust the slats at the slat chopper. Excess powder was removed from the slats before packaging. All slats were packaged in 22.7 kg slat boxes. Target quantity for EPOLENE C-15 slat coating was 4–5% by weight. Target slat dimensions were 4.45 cm long by 3.18 cm wide. Slat thickness was a function of the extruded melt viscosity of each blend.

Example 1

This experiment began by slatting a blend of 50% E1003 and 50% E1060. This blend slatted at 529 g/min. The next two attempts were with 65% and 75% E1003, respectively. The blend containing 65% E1003 was slatted at a rate of 454 g/min and the blend containing 75% E1003 was slatted at 529 g/min. This indicates that blends of E1003 and E1060 containing between 50% and 75% E1003 can be slatted at nearly the same rates. It was very surprising and unexpected that a blend of 75% E1003 and 25% E1060 slatted to well,

Example 2

An attempt was made to slat 100% E1003. A few slats were able to be made at a nominal rate of 378 g/min, but could not run for more than a few minutes before the slat strand would deform and gum up the take up rolls and chopper. A couple kilograms of E1003 slats were able to be captured, but one could not cut the 100% E1003 slat strands consistently. The slat line had to be shut down and it took several minutes to remove the gummed up E1003 from the take-up rolls and the chopper blade. Two more attempts were made to slat 100% E1003, but with no success.

Example 3

The next two trials were with blends containing 85% and 90% E1003. Both of these blends were slatted at rates of 454 g/min. It was extremely surprising and unexpected that a blend of 90% E1003 and 10% E1060 could be slatted without complication. The blend containing 90% E1003 appeared to be almost too soft to slat, but slatted continuously with few problems.

I claim:

1. A slattable polyolefin composition comprising a blend of at least two different polypropylene compositions, wherein at least one polypropylene composition is an amorphous propylene copolymer composition, said amorphous propylene copolymer composition comprising no more than about 90 weight percent propylene and up to 70 weight percent of an alpha olefin comonomer having 2 to 8 carbon atoms, wherein said amorphous polypropylene composition has a needle penetration of greater than 70 to less than 100 dmm at 23°C. and a Brookfield Thermosel Viscosity below 1,000 cP at 190°C.

2. The slattable polyolefin composition according to claim wherein said blend contains no more than 90 weight percent propylene and up to 70 weight percent of a comonomer selected from the group consisting of alpha olefins having 2 to 8 carbons, and further comprising:

a first amorphous propylene copolymer having a needle penetration above 70 dmm at 23°C.; and a second amorphous propylene copolymer having a needle penetration such that the resulting blend has a needle penetration between 70 and 100 dmm at 23°C.

3. The slattable polyolefin composition according to claim 1, wherein the polyolefin composition comprises:

a low tensile strength amorphous propylene copolymer having a tensile strength of less than 150 kPa, a needle penetration of at least 95 dmm at 23°C., and a viscosity of less than 1000 cP at 190°C.; and an amorphous propylene copolymer having a tensile strength greater than 150 kPa, a needle penetration of less than 70 dmm at 23°C., and a viscosity of at least 1000 cP at 190°C.

4. The slattable polyolefin composition according to claim 3, wherein said low tensile strength amorphous propylene copolymer is in a concentration of about 60 to 95 weight percent of the polyolefin composition.

5. The slattable polyolefin composition according to claim 3, wherein the amorphous propylene copolymer having a tensile strength greater than 150 kPa is in a concentration of about 5 to 40 weight percent of the polyolefin composition.

6. The slattable polyolefin composition according to claim 1, wherein said alpha olefin comonomer is ethylene.

7. The slattable polyolefin composition according to claim 1, wherein the alpha olefin comonomer is hexene.

8. The slattable polyolefin compostion according to claim 6, wherein the alpha olefin comonomer is present in the amount of 20 to 70 weight percent of the amorphous propylene copolymer composition.

9. The slattable polyolefin composition according to claim 7, wherein the alpha olefin comonomer is present in the amount of 10 to 30 weight percent of the amorphous propylene copolymer composition.

* * * * *

UNITED STATES PATENT AND TRADEMARK OFFICE
CERTIFICATE OF CORRECTION

PATENT NO. : 5,733,645
DATED : March 31, 1998
INVENTOR(S) : Marc Stacey Somers

It is certified that error appears in the above-indentified patent and that said Letters Patent is hereby corrected as shown below:

Column 8, Line 13, after "according to claim" insert --1--.

Signed and Sealed this

Ninth Day of June, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,733,645
DATED : March 31, 1998
INVENTOR(S) : Marc Stacey Somers

It is certified that error appears in the above-indentified patent and that said Letters Patent is hereby corrected as shown below:

Column 1, Line 49, "amorphods" should be --amorphous--.

Column 1, Line 65, "comohomer" should be --comonomer--.

Column 8, Line 44, the claim reference numbered "6" should be --7--.

Column 8, Line 48, the claim reference numbered "7" should be --6--.

Signed and Sealed this

Third Day of November, 1998

*Attest:*

*Attesting Officer*

BRUCE LEHMAN

*Commissioner of Patents and Trademarks*